(12) United States Patent
Udaya et al.

(10) Patent No.: US 12,210,998 B2
(45) Date of Patent: Jan. 28, 2025

(54) EXPLORATORY ANALYSIS OF CONTENT PACKAGE OBJECTS

(71) Applicant: SAP SE, Walldorf (DE)

(72) Inventors: Sahana Durgam Udaya, Bangalore (IN); Pranav Kumar, Bangalore (IN)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 18/071,269

(22) Filed: Nov. 29, 2022

(65) Prior Publication Data

US 2024/0177103 A1    May 30, 2024

(51) Int. Cl.
*G06Q 10/08* (2024.01)
*G06F 16/28* (2019.01)
*G06Q 10/0833* (2023.01)

(52) U.S. Cl.
CPC ....... *G06Q 10/0833* (2013.01); *G06F 16/289* (2019.01)

(58) Field of Classification Search
None
See application file for complete search history.

(56) References Cited

U.S. PATENT DOCUMENTS

| 11,671,516 | B1 * | 6/2023 | Udaya | G06Q 10/10 |
| | | | | 709/201 |
| 2023/0086389 | A1 * | 3/2023 | Wu | G06V 20/36 |
| | | | | 463/31 |
| 2024/0054145 | A1 * | 2/2024 | Udaya | G06F 16/288 |
| 2024/0144489 | A1 * | 5/2024 | Nguyen | G06T 7/246 |

FOREIGN PATENT DOCUMENTS

CA    2988104 C * 10/2023 ........... G06F 16/178

* cited by examiner

*Primary Examiner* — Natisha D Cox
(74) *Attorney, Agent, or Firm* — Fountainhead Law Group, PC

(57) ABSTRACT

Mechanisms are disclosed for visualizing and comparing an import and update history of content package objects in an analytic content system. Object to package mapping identifiers corresponding to the content package object are received. A package-identifier object state of a state of the content package object is received corresponding to an imported package associated with a particular package identifier. A modified object state to an original object state is compared prior to re-export of the content package object. The current object state to an original object state of the content package object is compared prior to importing the content package object from the imported package. A visualization of an import history of the content package object is displayed. In response to determining that an issue is present with a most recent import of the one or more content package objects, imports are rolled back to a stable set of objects.

20 Claims, 9 Drawing Sheets

EXPLORATORY ANALYSIS OF CONTENT PACKAGE OBJECTS

TECHNICAL FIELD

Embodiments generally relate to exploratory analysis of content package objects, and more particularly to improved mechanisms for visualizing and comparing an import and update history of one or more content package objects in an analytic content system.

Conventional analytic content network (ACN) architectures involves three primary steps for transportation of analytics objects across tenants in a multi-tenant analytics platform. First, a package creator creates a package Next, the package creator shares the package to a package sharing destination Finally, a package consumer imports the package. During export, a user may select an object and dependencies associated with the object are automatically selected by a framework associated with the ACN. Under this approach, there is no way to determine which packages an object is part of, i.e., conventional ACN packaging systems do not provide an object-package mapping Moreover, during import, a user is provided the information about object existence and location (if it already exists in target). One can also view import history. However, during import there is no way to visualize an object's current state in the tenant and what will be the state of object post package import—no object state comparison before import Also, post import there is no way for user to determine which package import updated the object and how—no analytic content import history A package can contain 'n' number of objects like story, model, dimension etc. These objects can be part of same or multiple packages. For example, a particular package designated "PackageX" may contain objects including story1, model1, and dimension1. Story1 is updated to consume model2 along with model1. A second package designated "PackageY" may contains objects denominated story1, model2. This gets complicated when an object is part of many packages. During an object's lifespan it can be modified multiple times resulting in multiple states. There is no way to visualize the transition of object across states. Additionally, no way to revert to specific snapshot if needed.

Accordingly, what is needed is an improved mechanism for visualizing and comparing an import and update history of one or more content package objects in an analytic content system that overcomes the above-described problems and challenges.

SUMMARY

Disclosed embodiments address the above-mentioned problems by providing one or more non-transitory computer-readable media storing computer-executable instructions that, when executed by a processor, perform a method for visualizing and comparing an import and update history of one or more content package objects in an analytic content system, the method comprising: receiving one or more object to package mapping identifiers corresponding to the content package object, retrieving a package-identifier object state of a state of the content package object corresponding to an imported package associated with a particular package identifier, comparing a modified object state to an original object state prior to re-export of the content package object, comparing the current object state to an original object state of the content package object prior to importing the content package object from the imported package, displaying a visualization of an import history of the content package object, and in response to determining that an issue is present with a most recent import of the one or more content package objects, rolling back updates to package content corresponding to a stable import.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
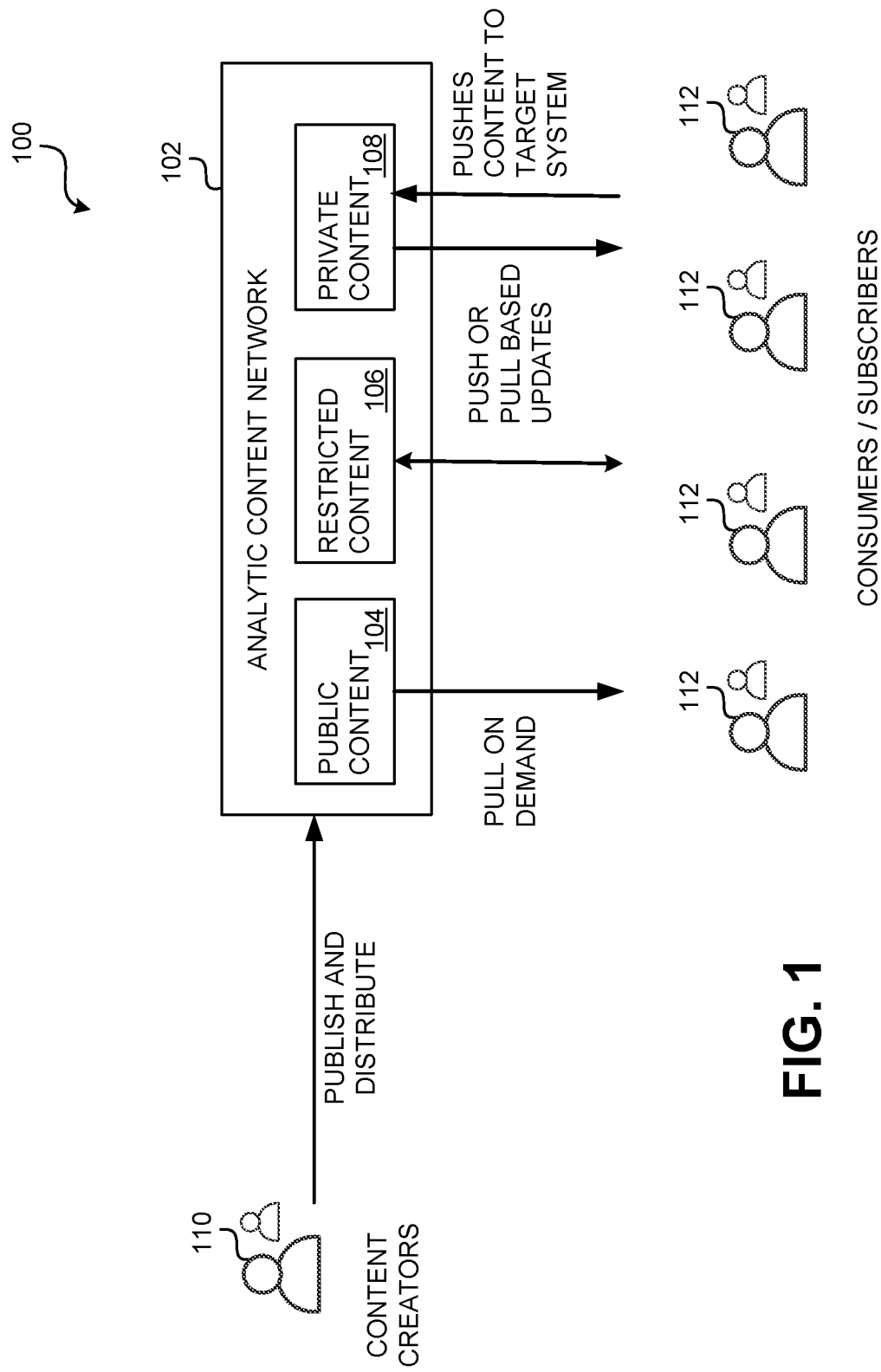
FIG. 1 is a system diagram illustrating operation of an analytic content network consistent with the present teachings.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Overview

The present teachings describe methods and systems for visualizing and comparing an import and update history of one or more content package objects in an analytic content system. Certain cloud analytics platforms may combine business intelligence (BI) as well as planning and predictive analytics capabilities. In BI applications, analytics content (i.e., model, story, visualizations, etc.) plays a central role in discovering the unseen patterns to boost the technical effectiveness of analytics. Hence sharing of analytics content amongst users can be quite helpful to facilitate collaboration across organizations, technologies, and industries. Standard content templates can be reused by multiple users by substituting user-specific data. This infrastructure for sharing analytics content in connection with an analytics platform may be referred to as an analytics content network (ACN). The content entity that contains analytics platform content to be shared may be referred to as a "package." ACN may be considered one of the important infrastructure components of an analytics platform. ACN is present in analytics platform landscapes as a central component. In this way, an ACN may be considered logically as one global content network which can provision or share any analytics platform content. As ACN may be connected out-of-the-box to any analytics platform tenant, ACN can provision and share content into any analytics platform tenant. ACN supports a few basic end-user workflows. First, an analytics platform content creator creates analytics platform content in the form of stories, models, dimensions, connections, Value-Driver Trees (VDT) etc. If authorized, the analytics platform content creator can then export this content from the analytics platform tenant to ACN by creating a "content package" which can contain any number of these content items and share this with multiple other tenants. Next, an analytics platform content user can view all available content packages in their listing and import those packages relevant for their analytic workflows. This includes public content (templates or demonstration content) and private content (shared privately with other analytics platform users typically within a common organization). To achieve sharing across tenants, the content is bundled in what is referred to as a "package." A package contains the details of each object present in the package, the dependency information between those objects and an overview which summarizes details regarding contents of the package.

Mechanisms consistent with the present teachings may provide enhanced ACN capabilities, making frameworks for sharing analytics content more robust and resilient. First, an ACN front end may provide a mechanism to view object to package mappings. Next, mechanisms consistent with the present teachings may compare object state in package vs an object's current state in particular tenant before re-exporting (and overwriting) the package. Next, mechanisms consistent with the present teachings compare an object's current state in a particular tenant vs object state in package before import. In these embodiments, a user should be able to visualize an object's import history. Nest, mechanisms consistent with the present teachings allow a user to rollback to any of the previous given states, for various reasons. A first reason relates to here being an issue in a latest import. Alternatively, a user may need to branch out from any of the previous states to maintain objects of both states. To this end, the ACN may complete the cycle for user to analyze object to package mappings before performing export and import operations. A package that may be imported may be designated a candidate package, as the package is a candidate for being imported.

In one example a first state exists with a designation of "State1." In this state, PackageX contains Story1. Story1 contains a text view and a table. Story1 depends on model1. PackageY contains Story1. Story1 contains a text view, a table and a pie chart widget. Story1 depends on model1 and model2. PackageX contains Story1, which corresponds to state1 of Story1. In this example, an object to package mapping may be derived as follows. First, a list objects for export is prepared. Next, an object for which package mapping should be determined is selected. Next, object_id (here, A9785B8217AFD16D2F31200DDF66A4DF=Story1 id) is sent to a backend associated with the ACN. Next, the ACN gets all packages containing this object from the backend, and the backend persists all objects that are part of the package. Next, a query is executed to obtain list of packages. Further, using Story1 data present in package one can determine the state of object (Story1) in each of the packages.

In another embodiments, objects for export may be listed as follows. First, an object is selected for which package mapping should be determined. Next, an object identifier (here, A9785B8217AFD16D2F31200DDF66A4DF=Story1 id) is sent to the backend. Next, the ACN gets all packages containing this object and iterate through each package, by package identifier, retrieving a package identifier object state corresponding to a package bearing the package identifier. While iterating the ACN may check whether any widgets are present. Next, the ACN iterates over all widgets and associates the corresponding widget against the corresponding package. Next, data source details are captured and response is sent. Such data source details may be designated in connection with one or more data source descriptors.

In some embodiments, package import functionality is provided consistent with the present teachings. First, PackageX and PackageY are imported. In some embodiments, current state and PackageX state may be the same or substantially similar. A current state indicates the state of object in the tenant, and current state may be the same as a previous transport state. Where 'current state' and 'PackageX state' is exactly same, this means that objects have not been modified in the particular tenant. The current state may also be different with respect to previous transport state(s), which means that prior retrieved package contents of some objects have been manually modified in the tenant. To import packages, certain modifications to Story1 are carried out, here Table to line chart. At this point, PackageY, current state and PackageX are different. In some cases, importing a new package overlaying a most recent state may cause changes to one or more objects that will result in an unstable state of a corresponding application or report. In such an instance, it may be beneficial to roll back such changes until the object state results in a prior stable state for the application or report.

In another example, an ACN interface provides a visualization of object-state and object import history First, PackageX is imported and story1 is created in the ACN system. Here, story1 contains two views and a model. PackageY is imported and story1 is updated in the system. Here Story1 contains three views and two models. A user clicks on version history for story1. Next ACN has both state1 and state2 related information. Next, the visualization enables sorting states by package update timestamp and send response. Next the system iterates over all states received in response. A first state corresponds to a condition where an object was first created so all entities are completely new. Visualizing subsequent states involves checking each entity "id" to determine whether it exists in previous and current state. Next the system checks each entity "id" to determine whether it doesn't exist in a previous state but exists in the new state. Finally, each entity "id" is checked to determine whether it exists in previous state but doesn't exist in new state which results in a deleted entity.

Operational Environment for Embodiments

FIG. 1 is a system diagram 100 illustrating operation of an analytic content network consistent with the present teachings. Content creators 110 create content for publishing and distributing in connection with analytic content network (ACN) 102. ACN 102 may contain public content 104, restricted content 106, and private content 108. Public content 104 may be pulled on demand by content consumers 112. Similarly restricted content 106 may be subject to push- or pull-based updates by content consumers 112. Finally, private content 108 may be updated in connection with pushes of content to a particular target system by content consumers 112.

Figure 2A:
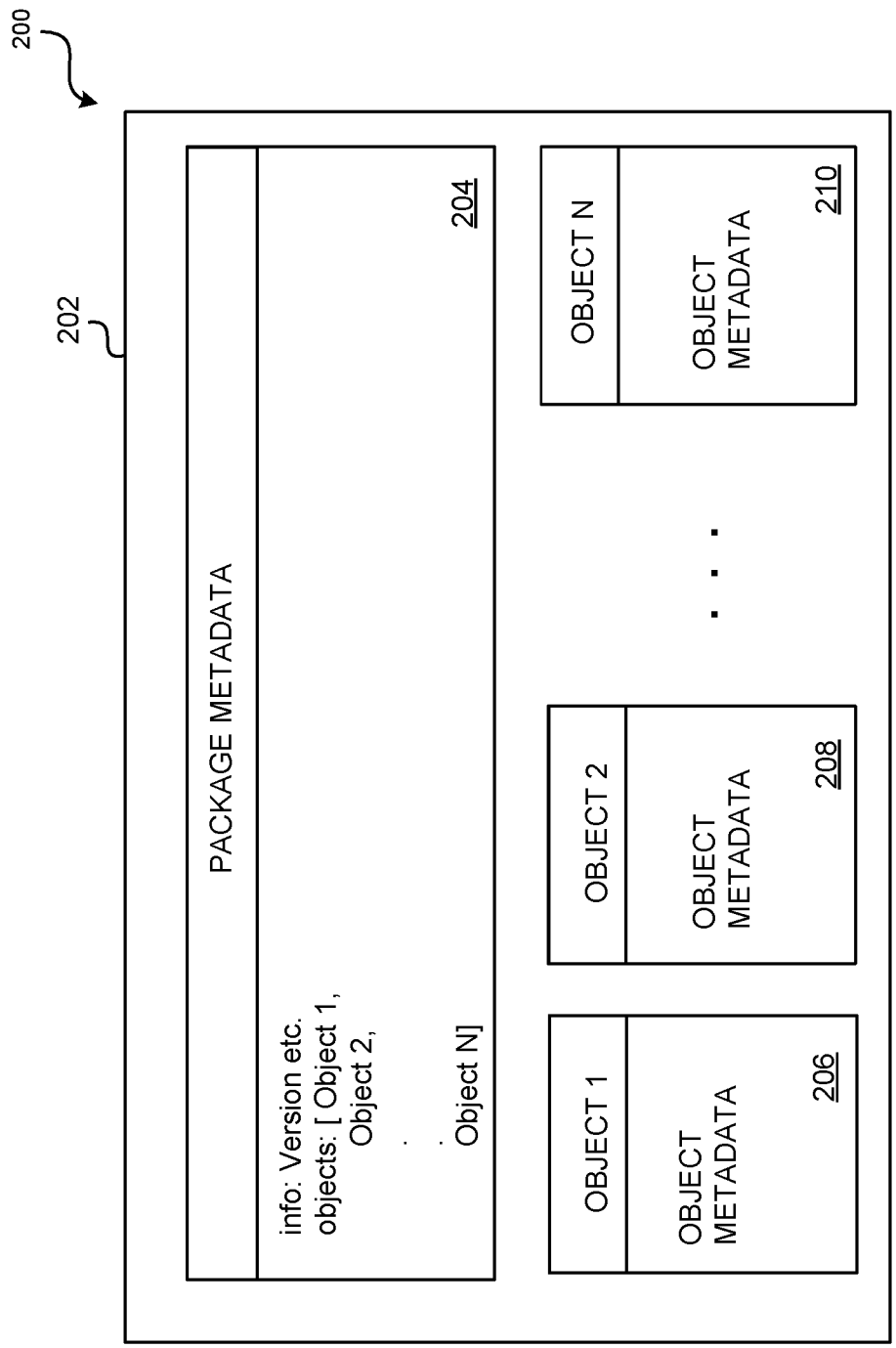
FIG. 2A is a diagram illustrating example skeleton of an analytic content network package structure consistent with the present teachings.

FIG. 2a is a diagram 200 illustrating example skeleton of an analytic content network package structure consistent with the present teachings. Package structure 202 contains package metadata 204, which may be defined in connection with a definition structure such as JavaScript Object Notation (JSON) structure such that package metadata content may be derived from a corresponding JSON string. Various objects, such as object 206, object 208, and object 210 may be provided in connection with package structure 202.

Figure 2B:
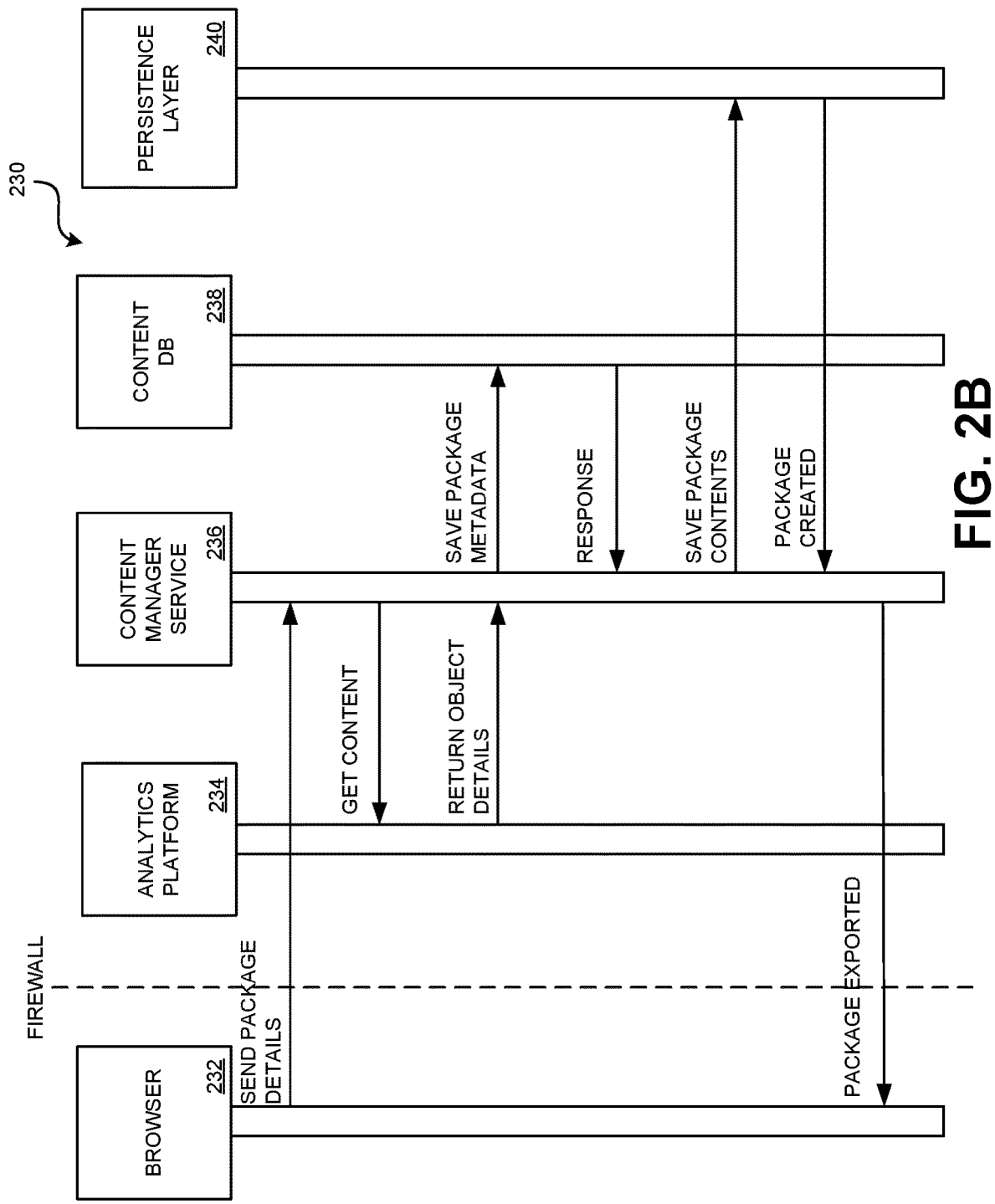
FIG. 2B is a diagram illustrating example package export consistent with the present teachings.

FIG. 2B is a diagram 230 illustrating example package export consistent with the present teachings. A package export process may be initiated in connection with browser 232. Such an export process may be initiated at design time by a user, which may involve the user clicking an option designated "New Export" to create a new package. This may also involve selecting required objects such as story, model, dimension, currency, roles, folder etc. The user may also provide certain additional information such as package name, description, details. The user may also optionally share an exported package with certain recipients, a particular technical field, industry, or other class of potential package recipients. Next, browser 232 sends package details to content manager service 236, which may perform one or more authorization checks to ensure that the user has the appropriate authorizations. This sending process may involve an application programming interface (API) call such as a web services API call. Once content manager service 236 receives the package details, content manager service 236 gets content from analytics platform 234, and analytics platform 234 then responds with object details. Next, content manager service 236 saves package metadata in connection with content database 238, in response to which content database 238 provides a response. Next, content manager service 236 saves package contents in connection with persistence layer 240, whereupon notification of creation of the package is confirmed from persistence layer 240 to content manager service 236. Finally, notification of exported package is confirmed by content manager service 236 to browser 232.

Figure 2C:
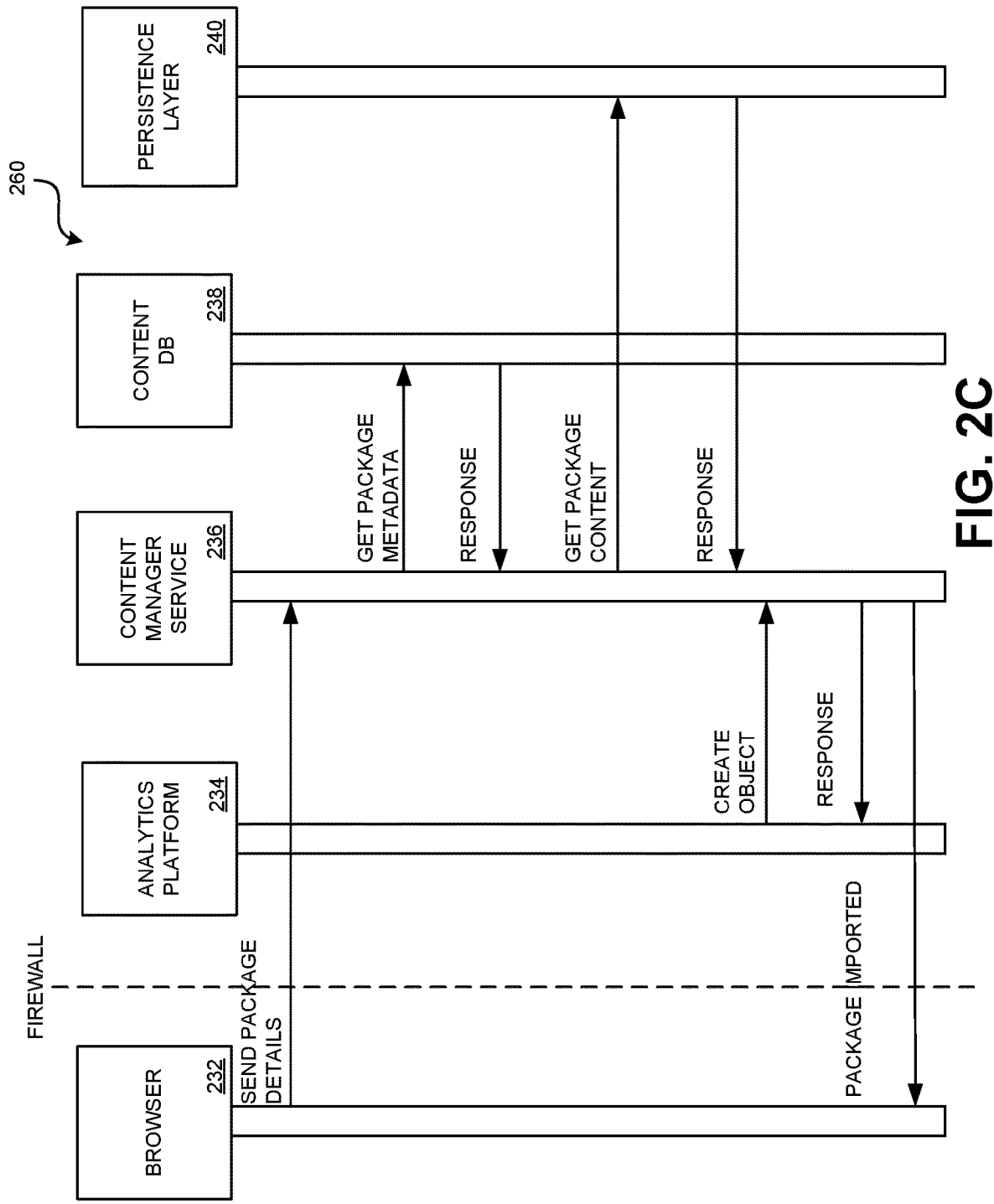
FIG. 2C is a diagram illustrating example package import consistent with the present teachings.

FIG. 2C is a diagram illustrating example package import consistent with the present teachings. A package import process may be initiated in connection with browser 232. Such an import process may be initiated at design time by a user, which may involve the user clicking (or otherwise selecting) a package to be imported. The user may then review a package summary associated with the package to be imported. Next, browser 232 sends package details to content manager service 236, which may perform one or more authorization checks to ensure that the user has the appropriate authorizations. Once content manager service 236 receives the package details, content manager service 236 may request package metadata from content database 238, in response to which content database 238 provides a response potentially including the requested metadata. Next, content manager service 236 requests package contents from persistence layer 240, whereupon persistence layer 240 provides requested contents to content manager service 236. Next, content manager service 236 creates one or more objects in connection with analytics platform 234, which provides a response regarding successful creation of the objects. Finally, confirmation is sent to browser 232 that the selected package has been imported.

Figure 3A:
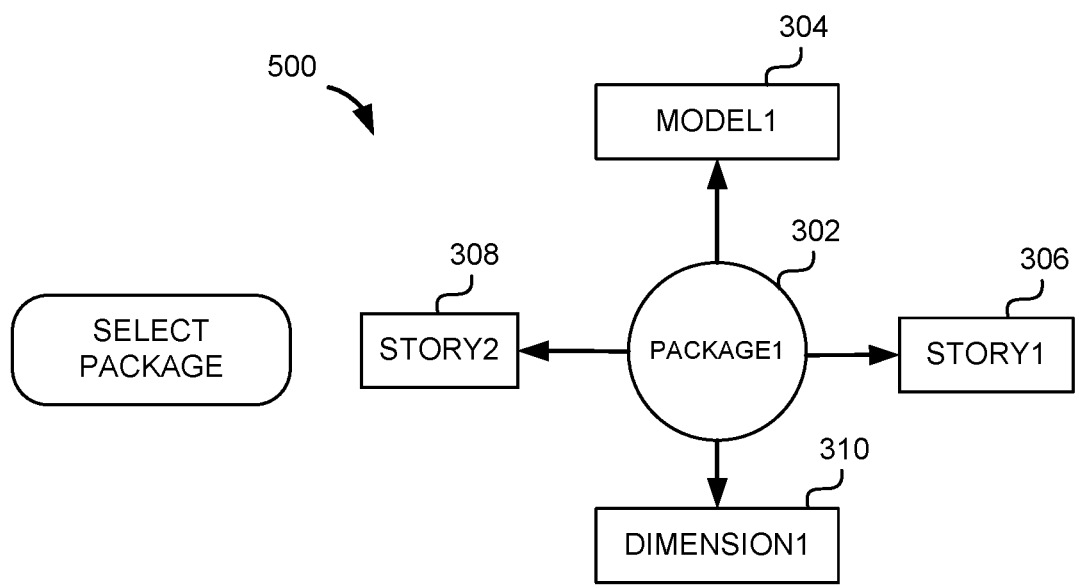
FIGS. 3A and 3B illustrate example object dependencies of an analytic content network package structure consistent with the present teachings.

FIG. 3A illustrates an example object dependency graph 300 of an analytic content network package structure consistent with the present teachings. In this graph, package 302, denominated "PACKAGE1" contains several objects. In this depiction, model 304, denominated "MODEL1" is associated with package 302. Similarly, dimension 301, designated "DIMENSION1" is associated with package 302. Finally, story 308 and story 306 is associated with package 302 as shown in FIG. 3A. Such a visualization may be used to select a package consistent with the present teachings.

Figure 3B:
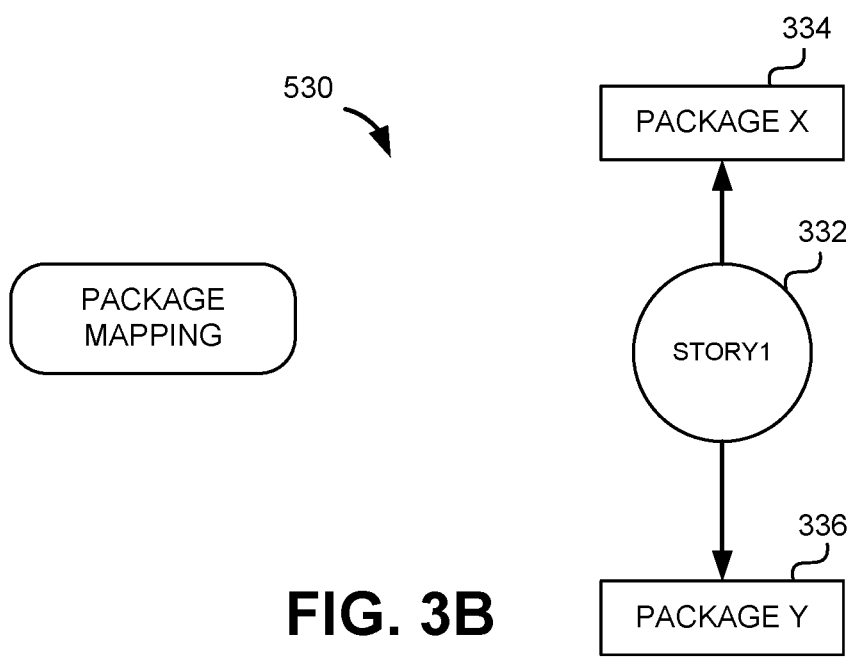

FIG. 3B illustrates another example object dependency graph 330 of an analytic content network package structure consistent with the present teachings. In this depiction story 332 is associated with multiple package, namely package 334, denominated "PACKAGE X" and package 336, denominated "PACKAGE Y." Such a visualization may be used for package mapping consistent with the present teachings.

Figure 3C:
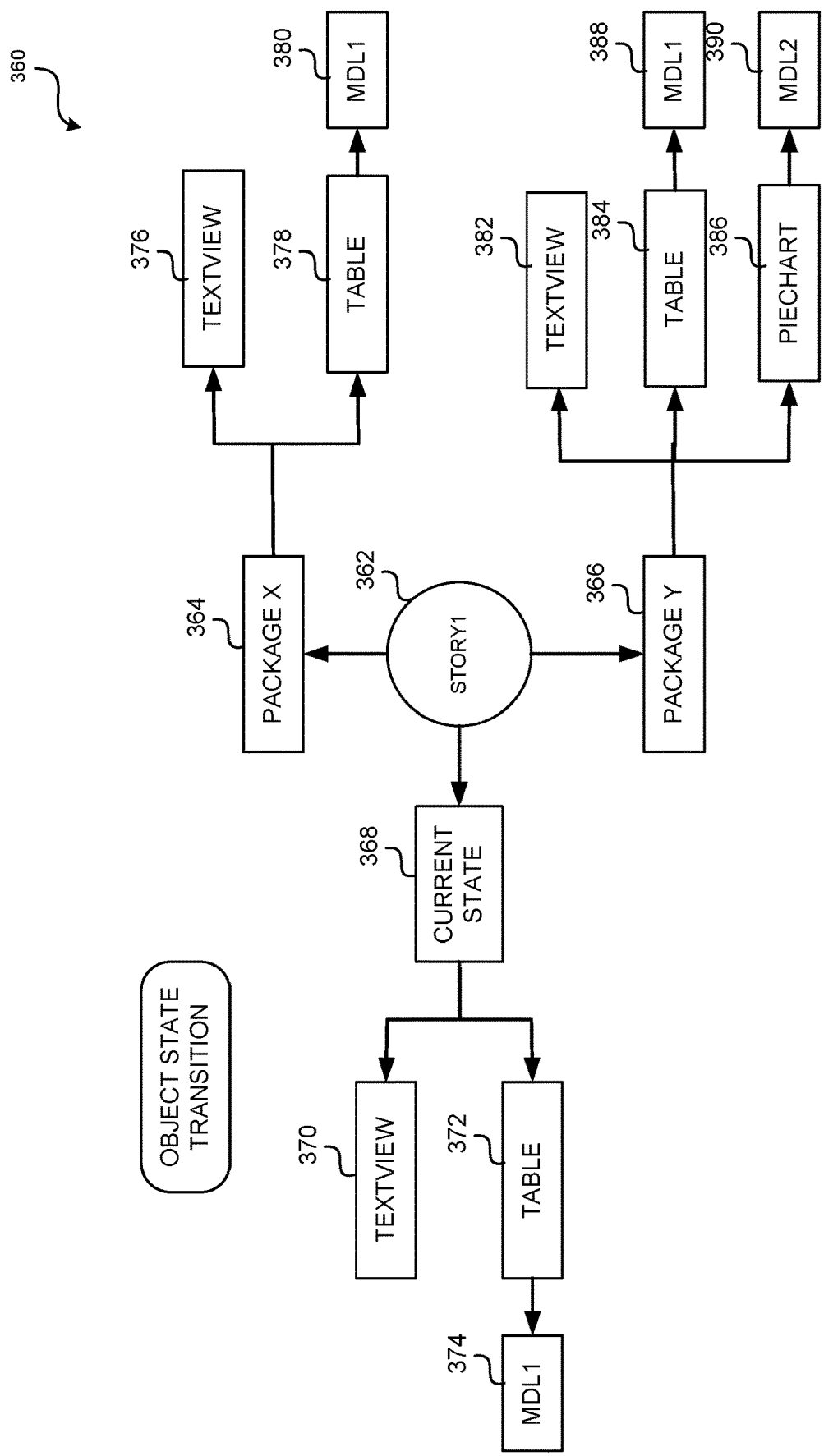
FIG. 3C illustrates an example object-package mapping associated with an analytic content network package structure consistent with the present teachings.

FIG. 3C illustrates an example object-package mapping 360 associated with an analytic content network package structure consistent with the present teachings. Package mapping 360 illustrates a hierarchical graph of dependencies associated with two different packages, namely package 364 and package 366. In some embodiments, a user is able to visualize various states of an object across different packages and in the tenant before any subsequent export and/or import workflow. Such a visualization helps in deciding which packages need to be updated if an object is modified. Decision making, such as whether to create a new package with a given object or whether there is already an existing package with the necessary objects.

Embodiments consistent with the present teachings have the benefit of effective usage of cloud storage space. Managing packages is easier as a user has an ability to create (or import) packages after analyzing existing packages. In this way, a user can understand which package made which changes to an object, how an object is impacted with new package import, and how an object has evolved over various package imports.

Figure 4A:
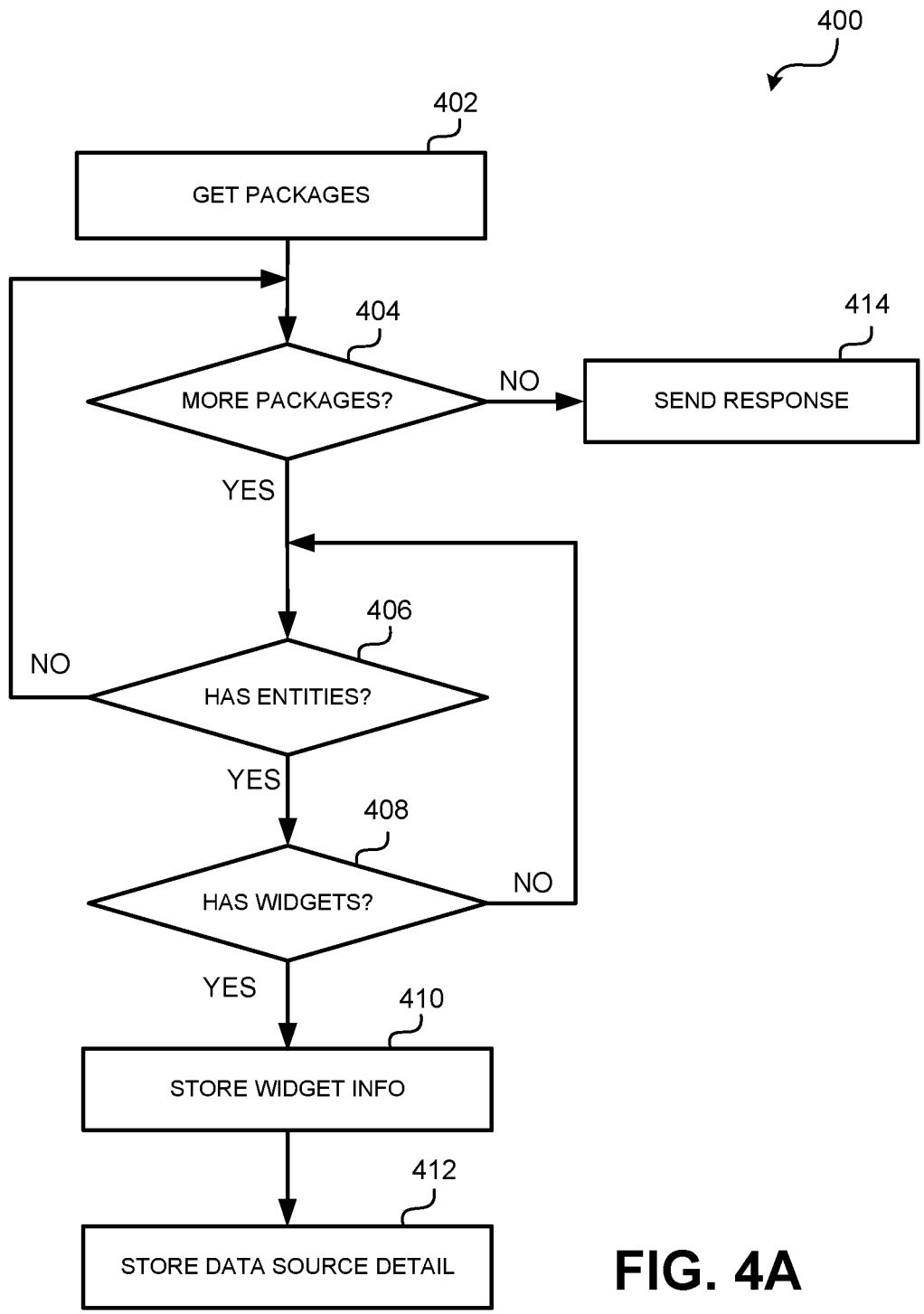
FIGS. 4A and 4B illustrate flow diagrams depicting example methods for visualizing and comparing an import and update history of one or more content package objects in an analytic content system according to certain embodiments.

FIG. 4A illustrates an example flow diagram 400 depicting example methods for visualizing and comparing an import and update history of one or more content package objects in an analytic content system according to certain embodiments. First, at step 402, the system gets a set of packages associated with a particular grouping of analytics content comprising an original object state. Next, at step 404, it is determined whether there are more packages. If not, a response is sent at step 414. If more packages are present execution proceeds to test 406, where it is determined whether a particular package has more entities. If not, execution proceeds again to test 404. If more entities exist, execution proceeds to test 408, where it is determined whether there are additional widgets. If not, execution proceeds back to test 406, and if so, execution continues to step 410. At step 410, widget information is stored. Finally, at step 412 data source details are stored including a current object state.

Figure 4B:
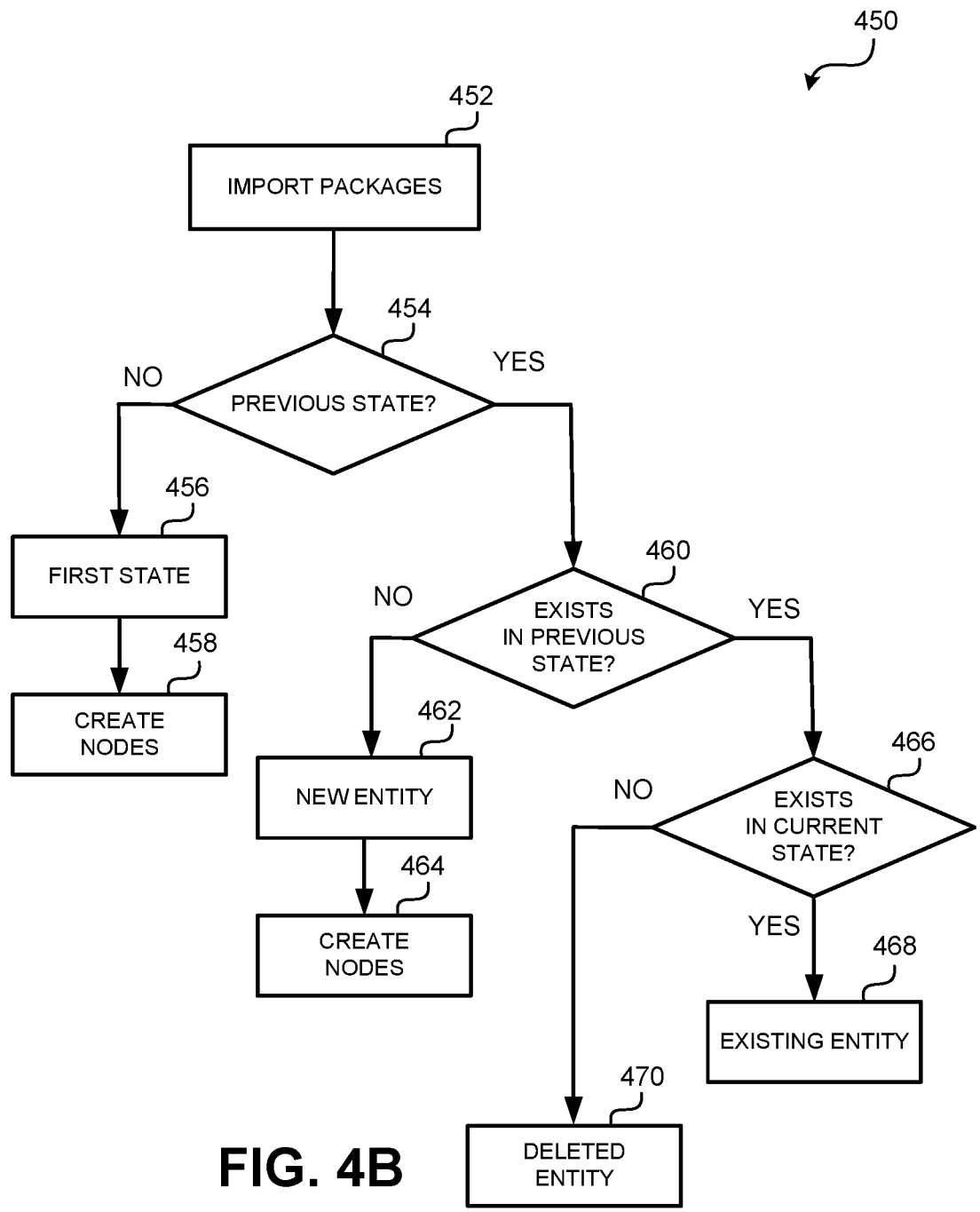

FIG. 4B illustrates another example flow diagram 450 depicting example methods for visualizing and comparing an import and update history of one or more content package objects in an analytic content system according to certain embodiments. First, at step 452, packages are imported. Next, at test 454 it is determined whether any previous state exists. If not, execution proceeds to step 456, where it is established that the system is in a first (initialization) state and all entities are new. Next at step 456, nodes are created corresponding to objects within the package. If at test 454, it is determined that a previous state exists, execution proceeds to test 460, where it is determined whether a particular entity exists in a previous state. If not, execution proceeds to step 462, where it is established that the entity is a new entity, and at step 464 new corresponding nodes are created. If at test 460, it is determined that an entity exists in a previous state, it is determined at step 466, whether the entity exists in the current state. If not, the entity is a deleted entity (step 470). On the other hand, if the entity does exist in the current state, execution proceeds to step 468 where the entity is designated as an existing entity.

Figure 5:
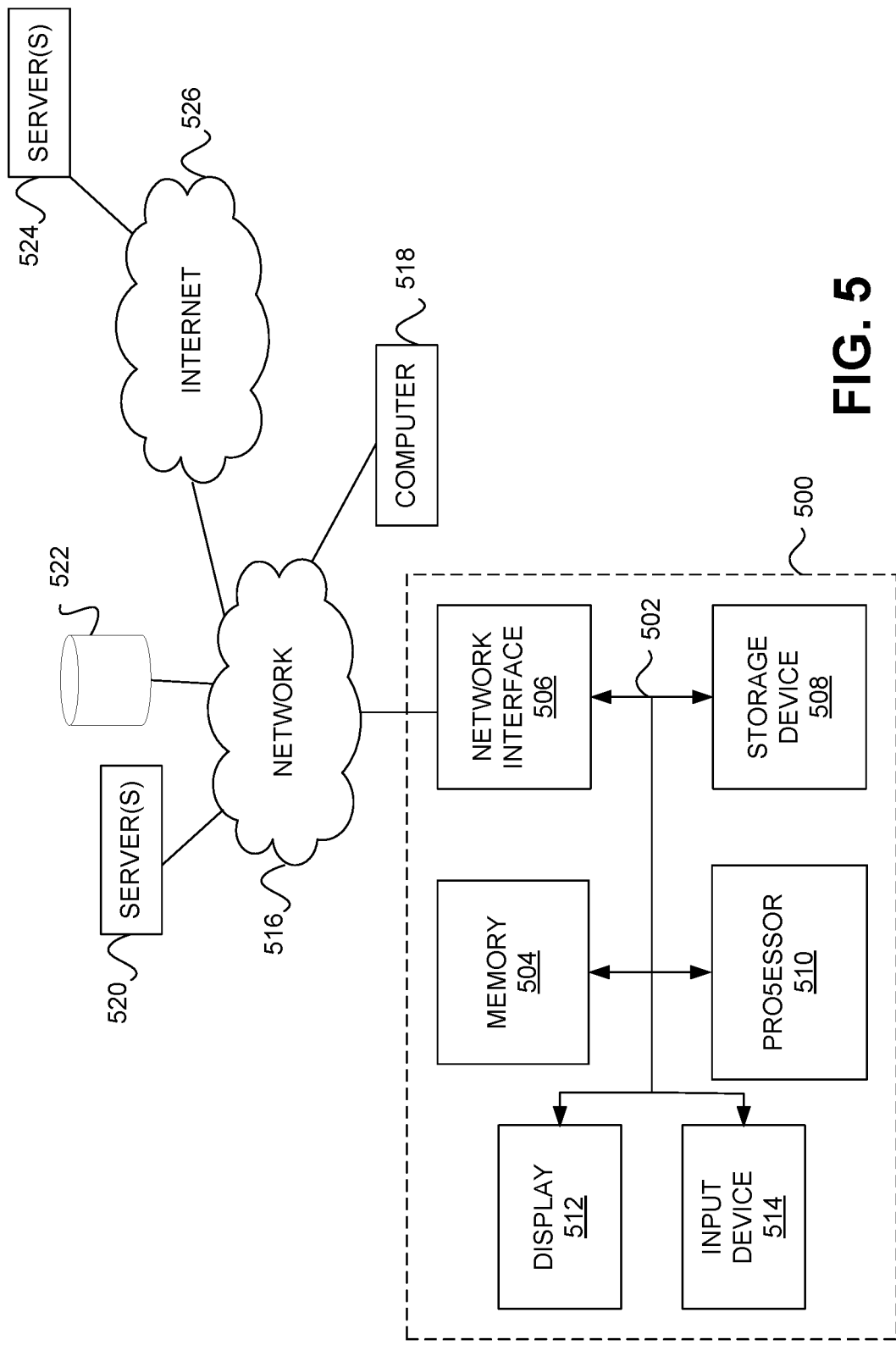
FIG. 5 is a diagram illustrating a sample computing device architecture for implementing various aspects described herein.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor that may be employed to cause actions to be carried out when instructions are executed by the processor. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage 522. Network 516 is in turn connected to public Internet 526, which connects many networks globally. In some embodiments, computer 500 can itself be directly connected to public Internet 526 as well as one or more server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

1. One or more non-transitory computer-readable media storing computer-executable instructions that, when executed by a processor, perform a method for visualizing and comparing an import and update history of one or more content package objects in an analytic content system, the method comprising:
   receiving one or more object to package mapping identifiers corresponding to the content package object;
   retrieving a package-identifier object state of a state of the content package object corresponding to an imported package associated with a particular package identifier;
   comparing a modified object state to an original object state prior to re-export of the content package object;
   comparing a current object state to an original object state of the content package object prior to importing the content package object from the imported package;
   displaying a visualization of an import history of the content package object; and
   in response to determining that an issue is present with a most recent import of the one or more content package objects, rolling back imports to a stable set of objects.

2. The non-transitory computer-readable media of claim 1, wherein the method further comprises:
   identifying the original state of the content package object by querying a package having a package mapping identifier in the one or more object to package mapping identifiers.

3. The non-transitory computer-readable media of claim 1, wherein the method further comprises:
   identifying a list of stored packages containing the content package object;
   for each candidate package in the list of stored packages containing the content package object, performing:
      identifying one or more widgets contained within the package;
      capturing one or more descriptors associated with a data source corresponding to the one or more widgets; and
      transmitting a response corresponding to the one or more descriptors.

4. The non-transitory computer-readable media of claim 1, wherein retrieving a package-identifier object state of a state of the content package object comprises:
   retrieving package contents corresponding to the imported package.

5. The non-transitory computer-readable media of claim 1, wherein displaying a visualization of an import history of the content package object further comprises updating current package contents with retrieved package contents.

6. The non-transitory computer-readable media of claim 1, wherein displaying a visualization of an import history of the content package object further comprises sorting states by package update timestamp.

7. The non-transitory computer-readable media of claim 1, wherein displaying a visualization of an import history of the content package object further comprises overwriting the content package object based on determining that an entity identifier exists in a previous and current state corresponding to the content package object.

8. A method for visualizing and comparing an import and update history of one or more content package objects in an analytic content system, the method comprising:
   receiving one or more object to package mapping identifiers corresponding to the content package object;
   retrieving a package-identifier object state of a state of the content package object corresponding to an imported package associated with a particular package identifier;
   comparing a modified object state to an original object state prior to re-export of the content package object;

comparing a current object state to an original object state of the content package object prior to importing the content package object from the imported package;

displaying a visualization of an import history of the content package object; and in response to determining that an issue is present with a most recent import of the one or more content package objects, rolling back imports to a stable set of objects.

9. The method of claim 8, wherein the method further comprises:

identifying the original state of the content package object by querying a package having a package mapping identifier in the one or more object to package mapping identifiers.

10. The method of claim 9, wherein the method further comprises:

identifying a list of stored packages containing the content package object;

for each candidate package in the list of stored packages containing the content package object, performing:

identifying one or more widgets contained within the package;

capturing one or more descriptors associated with a data source corresponding to the one or more widgets; and transmitting a response corresponding to the one or more descriptors.

11. The method of claim 10, wherein retrieving a package-identifier object state of a state of the content package object comprises:

retrieving package contents corresponding to the imported package.

12. The method of claim 11, wherein displaying a visualization of an import history of the content package object further comprises updating current package contents with retrieved package contents.

13. The method of claim 10, wherein displaying a visualization of an import history of the content package object further comprises sorting states by package update timestamp.

14. The method of claim 8, wherein displaying a visualization of an import history of the content package object further comprises overwriting the content package object based on determining that an entity identifier exists in a previous and current state corresponding to the content package object.

15. A system for visualizing and comparing an import and update history of one or more content package objects in an analytic content system, the system comprising:

at least one processor;

and at least one non-transitory memory storing computer executable instructions that when executed by the at least one processor cause the system to carry out actions comprising:

receiving one or more object to package mapping identifiers corresponding to the content package object;

retrieving a package-identifier object state of a state of the content package object corresponding to an imported package associated with a particular package identifier;

comparing a modified object state to an original object state prior to re-export of the content package object;

comparing a current object state to an original object state of the content package object prior to importing the content package object from the imported package;

displaying a visualization of an import history of the content package object; and in response to determining that an issue is present with a most recent import of the one or more content package objects, rolling back imports to a stable set of objects.

16. The system of claim 15, wherein the actions further comprise:

identifying the original state of the content package object by querying a package having a package mapping identifier in the one or more object to package mapping identifiers.

17. The system of claim 15, wherein the actions further comprise:

identifying a list of stored packages containing the content package object;

for each candidate package in the list of stored packages containing the content package object, performing:

identifying one or more widgets contained within the package;

capturing one or more descriptors associated with a data source corresponding to the one or more widgets; and transmitting a response corresponding to the one or more descriptors.

18. The system of claim 17, wherein retrieving a package-identifier object state of a state of the content package object comprises:

retrieving package contents corresponding to the imported package.

19. The system of claim 18, wherein displaying a visualization of an import history of the content package object further comprises updating current package contents with retrieved package contents.

20. The system of claim 17, wherein displaying a visualization of an import history of the content package object further comprises sorting states by package update timestamp.

* * * * *